Nov. 26, 1963  P. BERGER  3,112,428
APPARATUS FOR IGNITING AND OPERATING GASEOUS DISCHARGE DEVICES
Original Filed Oct. 30, 1957  5 Sheets-Sheet 1

Nov. 26, 1963   P. BERGER   3,112,428
APPARATUS FOR IGNITING AND OPERATING GASEOUS DISCHARGE DEVICES
Original Filed Oct. 30, 1957   5 Sheets-Sheet 4

Inventor
Paul Berger
By Silverman, Mullin + Coss
Attorneys

Nov. 26, 1963     P. BERGER     3,112,428
APPARATUS FOR IGNITING AND OPERATING GASEOUS DISCHARGE DEVICES
Original Filed Oct. 30, 1957     5 Sheets-Sheet 5

United States Patent Office 3,112,428
Patented Nov. 26, 1963

3,112,428
APPARATUS FOR IGNITING AND OPERATING GASEOUS DISCHARGE DEVICES
Paul Berger, Chicago, Ill., assignor to Advance Transformer Co., Chicago, Ill., a corporation of Illinois
Original application Oct. 30, 1957, Ser. No. 693,440, now Patent No. 2,947,909, dated Aug. 2, 1960. Divided and this application Apr. 11, 1960, Ser. No. 36,101
26 Claims. (Cl. 315—138)

This invention relates generally to apparatus for use in the ignition and operation of one or more gaseous discharge devices and particularly is concerned with circuits, ballast structures and systems energized from relatively low voltage A.C. lines which provide the high ignition voltages and lower operating voltages for such discharge device or devices.

This application is a division of my co-pending application Serial No. 693,440, filed October 30, 1957, having the same title as this application, now Patent No. 2,947,909.

In the co-pending application of which this application comprises a division, there was described and claimed an invention which was concerned with the novel construction of a transformer which utilized a central winding leg preferably having at least one bridged gap in the vicinity of a secondary winding of the transformer for preventing wave shape distortion, and in which the primary of the transformer was composed of two parts having respectively different coupling with said secondary winding, and in which said secondary winding was connected in auto-transformer relation either with the primary winding or a part thereof.

The same advantages and objects achieved with the invention described in said co-pending application generally comprise the objects and advantages sought for the invention herein, with the addition that certain specific objects are especially achieved with the invention herein.

The application herein is concerned with certain species originally illustrated and described in said co-pending application, now shown and described herein, in which the apparatus involved relates to apparatus and circuits intended to provide ignition and operating voltages for multiple lamp circuits. Especially such circuits have two gaseous discharge devices which are to be ignited seriatim, that is to say, one after the other, but which will operate in series, usually with a power factor correcting condenser in the series operating circuit.

Accordingly, the primary objects of the particular invention herein may be taken to include applying the teachings, principles, advantages and beneficial results of the said co-pending application (hereinafter called "parent" application) to circuits and apparatus intended to ignite and operate at least two gaseous discharge devices arranged in the so-called "sequence-start" and "rapid-start" configurations.

As in the case of the parent application, many other objects and advantages will appear as the description of the invention is set forth hereinafter. Variations are possible without departing from the teachings.

As in the parent case, uniform notation has been attempted throughout the figures, and in addition, in order to aid in an understanding of the invention herein and its relationship to the parent application, all of the figures of the parent case have been retained herein.

This invention is characterized by an unusual transformer construction in which there is provided a primary winding which has two parts in voltage opposition to one another, and at least one secondary winding which is in auto-transformer relationship with at least one of the parts.

The expression "auto-transformer relationship" usually connotes a transformer relationship in which the primary winding is connected into the output circuit along with a secondary winding so that the load is subjected to the voltages of the primary and secondary windings together, the voltages conventionally being additive. Since the relationship actually is merely a matter of connection, it is conceivable that instead of being additive to the voltage across the secondary winding, a portion of the primary winding may be in voltage opposition. It is also conceivable that a relationship which is initially bucking on open circuit could eventually become additive after operation commences. This occurs, for example, in one of the circuits illustrated in U.S. Patent No. 2,558,293.

In this specification, the reference to the expression "auto-transformer relationship" will not be limited to one in which the primary and secondary windings are necessarily in additive relationship. This is a definition which will be carried into the claims as well, and is necessary because the two parts of the primary winding herein are in voltage opposition one to the other, and hence one of these parts will be in voltage opposition to the secondary winding if connected into the operating circuit. In several circuits both of the primary winding parts are connected into the operating circuit and hence the secondary winding will be in auto-transformer relationship with both of said parts, although bucking one and additive to the other. In other circuits, one part of the primary winding which is in voltage opposition to the secondary winding, considering a series loop containing both of these windings, is not connected into the operating circuit and hence only the second part is in auto-transformer relationship with the secondary winding, and it is additive relative thereto.

The invention originally evolved from the urgent need for obtaining a device for use in providing high efficiency ignition and operation for a single gaseous discharge device which had good power factor and hence required the secondary winding to carry a leading current, but in a compact and economical construction. As will be seen hereinafter, it was discovered that the basic form of the invention is as well applicable to a great many circuits of different types, giving to these circuits the advantages and benefits referred to heretofore.

Figure 1:
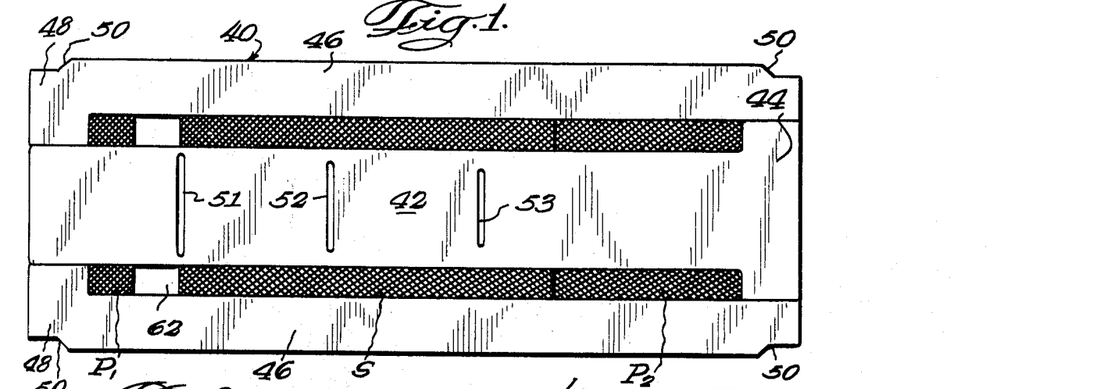
FIGS. 1 and 6 are diagrammatic sectional views through transformers constructed in accordance with the invention, illustrating primarily the formation of the core and the manner of placement of the windings thereon, illustrating clamped core structures, as compared with the forced core type of FIG. 14.
Figure 2:
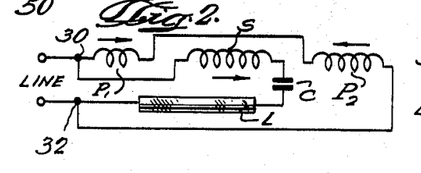
FIGS. 2, 3, 4, 5, 7, 8 and 9 are elementary embodiments of the invention suitable for use with cores of FIGS. 1 and 6. These forms of the invention are claimed in the parent case.

Considering first the basic form of the invention, as illustrated in FIGS. 1 and 2, this apparatus was intended especially for the ignition and operation of a single relatively high voltage gaseous discharge device from a low voltage A.C. source. The circuit comprises a gaseous discharge device L in series with a condenser C which causes the series secondary winding S to have a leading current flowing therethrough. The secondary winding S is connected between the condenser C and one terminal 30 of the primary winding which, as seen, is formed of two parts $P_1$ and $P_2$ connected in series. The opposite terminal 32 of the primary winding $P_1$—$P_2$ is connected to the left hand terminal of the gaseous discharge device L. A conventional low voltage A.C. line is connected across the terminals 30 and 32 of the primary winding $P_1$—$P_2$ and hence it will be seen that the primary winding including both parts and the secondary winding S are in auto-transformer relationship insofar as the load is concerned. The load in this case can be considered as the gaseous discharge device L although the condenser C may be technically included if one speaks of the load of the transformer per se.

The voltage which is available at the terminals of the gaseous discharge device on open circuit comprises the vectorial sum of the voltages across the windings $P_1$, $P_2$ and S. Substantially the same vectorial sum is effectual to maintain the discharge device in operation except that when current flows through the lamp, the vectorial sum of the voltages across the discharge device L and the condenser C must be equal to the vectorial sum of the voltages of $P_1$, $P_2$ and S. Also the actual values will be different on ignition and operation.

Although all winding of coils is done on the same type of machines, and in the same direction, the open circuit voltage relationship between windings can be controlled by the particular manner of connecting their terminals. Thus, windings can be connected either in voltage opposition or in additive voltage relationship.

The open circuit voltage relationships of the windings of FIG. 2 relative one another are arranged according to the invention as shown by the arrows alongside of the respective windings. Thus it will be seen that while the arrows of the windings S and $P_2$ are additive, the arrow of the winding $P_1$ is in a direction opposite to both of the other arrows and hence this part of the primary winding is in voltage opposition relative the other primary part $P_2$.

One would normally deduce that the total line voltage is not available for ignition and operation of the gaseous discharge device L since the two primary parts $P_1$ and $P_2$ are connected in series with one another, are in direct voltage opposition, and together are connected across the line. Further one would deduce from the information known concerning transformer action, that if the two parts of the primary winding are in opposition, their inductive influence upon the secondary winding will also be bucking and therefore the secondary winding S would not get the benefit of the maximum induced voltage therein.

While the statements above are true for the ordinary transformer, it was found that they are not valid when the structure of the invention herein is used in forming the transformer of the apparatus for igniting and operating one or more gaseous discharge devices.

In FIG. 1 there is illustrated a clamped type of core 40 which has a central T-shaped winding leg 42, the crossbar end 44 of which is engaged between the ends of the L-shaped sides 46. The left hand end of the winding leg 42 is engaged between the short legs 48 of the L-shaped sides 46 and the entire assembly clamped together by means of clamps (not shown) such as for example might engage notches provided therefor at the corners 50. Along the length of the central winding leg 42 there are provided slots 51, 52 and 53 which provide in effect bridged air gaps beneath the secondary winding S.

From an examination of the core of FIG. 1 which is drawn in substantially correct proportions to a practical structure, it may be observed that the secondary winding S is of relatively longer dimension than the other coils. Because of this the flux distribution along the length of the winding S would not be uniform but for the use of the series of gaps or slots 51, 52 and 53. Note that the lengths of these slots decrease along the length of the winding S.

The construction of apparatus having such slots is described and claimed in co-pending application Serial No. 512,034, filed May 31, 1955, and entitled "Electrical Transformer," of which the inventor is Albert E. Feinberg and the assignee the same as the assignee of this application. Full details of the exact nature and operation of the series of slots may be ascertained from an examination of said co-pending application.

The invention herein does not require the series of gaps however, since quite satisfactory results have been achieved only by the use of the slot 51 adjacent the end of the winding S. Where additional economy is sought at the expense of some loss of good wave shape, satisfactory ballasts have been constructed in which the gaps are completely eliminated. Where the winding S is designed to carry leading current, some means for preventing saturation of the core in the vicinity of the secondary winding S is advisable in accordance with the teachings of U.S. Patent No. 2,461,957. This is best applied through the use of at least one slot in the vicinity of the secondary winding S, which in FIG. 1 is not at an end of the core amenable to the formation of a gap between the winding leg and sides or an end yoke.

Figure 27:
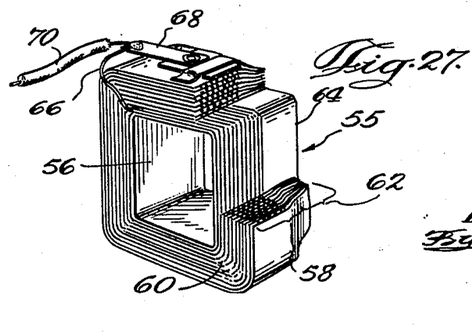
FIG. 27 is a perspective view of a coil with a section broken away to show the details of a portion of a primary winding constructed in accordance with the invention in which the air space of the coil is provided by the coil construction.

The windings S, $P_1$ and $P_2$ are all wound in the conventional manner on suitable forms, such as for example, square cross-section paper tubes, are suitably insulated with paper, tape, and the like, and the leads brought out and soldered to terminals. In the case of the winding $P_1$ a slight change may be made over the usual procedure, and this is illustrated in FIG. 27. A coil 55 is there illustrated suitable for use as the winding $P_1$ in the various circuits and systems referred to herein. The winding is formed on a paper tube 56 which serves as the form. This tube is of an inside diameter which will closely fit the central winding leg 42 to enable the completed coil 55 to be slid onto the winding leg. The winding is formed of a number of turns of wire arranged in layers and designated 58, the layers being alternated with layers of insulating paper 60. Adhesive tape is used to hold several of the layers of the wire turns in place, as for example, the beginning and ending layers, and there are other techniques used. It will be noted from the view that a portion of the length of the entire coil 55 which is designated 62 is devoid of wire. The tube does extend throughout the length of the coil 55, however. Thus, there is a blank space between the edge 64 of the tube 56 and the axial point along the tube where the winding 58 begins. In forming coils for transformers of this type, the usual technique is to form a great many coils along a length of tubing and then to saw the individual windings from the length, pull the terminal ends out as at 66, and to attach them to terminals as at 68 to which the lead wires such as 70 are soldered. In this case, the space 62 is deliberately permitted to remain when the coils are sawed apart.

The windings S and $P_2$ are wound conventionally, and are assembled on the winding leg 42 as shown in FIG. 1 with the primary part $P_2$ on the right hand end followed in order by the secondary winding S and the primary part $P_1$. When the primary part $P_1$ is placed on the winding leg, the blank portion 62 will occupy the space between the turns portion 58 and the end of the secondary winding S and hence such a blank space is designated 62 in FIG. 1. Obviously the winding $P_1$ could be formed conventionally, and an additional plug of non-metallic material inserted at 62.

Returning now to the discussion of the open circuit voltage relationship, it has been found that when assembled in the manner described, that is with the space 62 deliberately formed between the winding $P_1$ and the secondary S, the open circuit voltage induced in the secondary S will be substantially greater than would be normally expected. It may even be greater than it would be if the windings $P_1$ and $P_2$ were additive.

Reference may be had to the parent case for a discussion of the theory of the basic invention, for certain tests and measurements that were made, and for examples of practical structures constructed in accordance with FIGS. 1 and 2.

Figure 3:
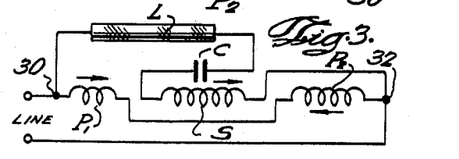

The circuit of FIG. 3 is a modified form of FIG. 2 in which the winding S and the gaseous discharge device L are interchanged relative one another. In FIG. 2, the primary part $P_1$ and the secondary winding S are connected together at the terminal 30 of the primary winding $P_1$—$P_2$, while in FIG. 3, the discharge device L is connected to $P_1$ at the terminal 30. The terminal 32 is likewise changed. Both circuits operate identically, with the ignition voltage for the gaseous discharge device comprising the vector sum of the voltages of $P_1$, $P_2$ and S.

Figure 4:
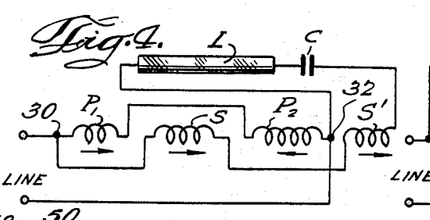
Figure 5:
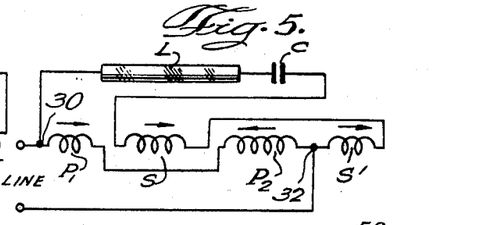

In FIGS. 4 and 5 there are illustrated two circuits of apparatus which include in addition to the windings $P_1$, $P_2$ and S, an additional winding S' which provides a voltage to augment that of the winding S. This is a variation which is provided by winding additional turns on top of the primary part $P_2$, thereby providing in effect a portion of the secondary which is quite tightly coupled with the primary part $P_2$. The two circuits differ in the placement of the two secondary windings S and S' and the gaseous discharge device L relative the primary parts $P_1$ and $P_2$. In FIG. 4 the terminal 30 is a line connection between the windings $P_1$ and S while the terminal 32 is a line connection between the gaseous discharge device L and the winding $P_2$. In FIG. 5, the terminal 30 is a line connection between the gaseous discharge device L and the primary part $P_1$, while the terminal 32 is a line connection between the primary part $P_2$ and the secondary winding S'.

In both of the circuits of FIGS. 4 and 5, the secondary windings S and S' form in effect a single secondary winding which is in auto-transformer relationship with the primary winding $P_1$—$P_2$. As will be seen, the windings $P_2$, S and S' have arrows representing the sense of the instantaneous open circuit voltage, all being additive. $P_1$ is in voltage opposition to the winding $P_2$ as indicated by its arrow.

The variations of the circuits of FIGS. 4 and 5 from one another are a matter of design for convenience of connection of components, and arrangement thereof relative to the line leads. The differences do not affect the operation of the apparatus.

Figure 6:
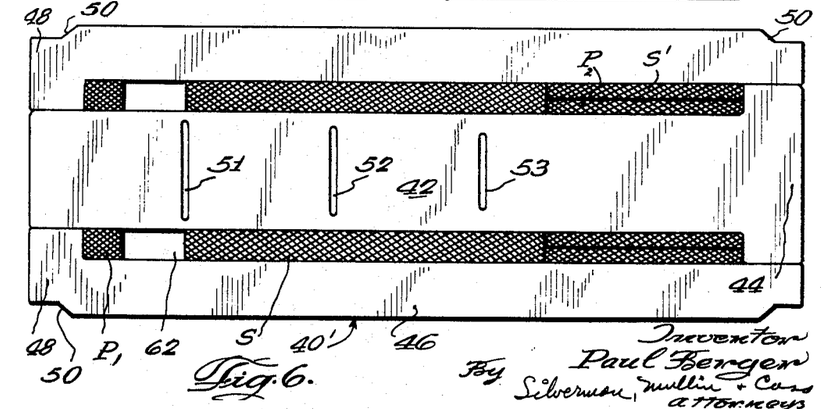

The circuit of FIGS. 4 and 5 was associated with the core 40' of FIG. 6 which does not vary substantially from the core 40 of FIG. 1, except in that the windings $P_2$ and S' are shown disposed on the right hand end of the winding leg 42 wound on top of one another.

Figure 8:
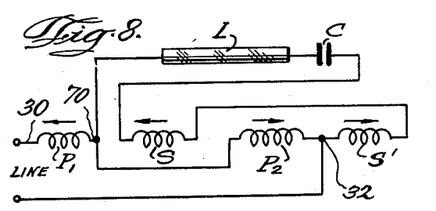

The parent case describes in detail the construction of a device according to FIG. 5 using a transformer core like that of FIG. 6 provided with all three slots 51, 52 and 53 for use with a 72 inch T-12 fluorescent lamp or a 96 inch T-12 lamp. A voltage study was described from which it was concluded that the inductive effect of the winding $P_1$ upon the apparatus was probably its most important effect. FIG. 8 was derived from FIG. 5 by moving the left hand terminal of the gaseous discharge device from the left hand terminal 30 of the winding $P_1$ to the right hand terminal 70 of the primary part $P_1$. This resulted in the secondary windings S and S', the condenser C and the gaseous discharge device L being connected in a series circuit across the primary part $P_2$ only, with all of the windings in the resulting loop being in voltage additive relation. Certain measurements of voltages of this apparatus are described.

Figure 7:
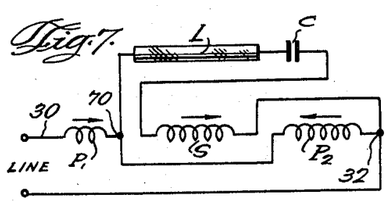
Figure 9:
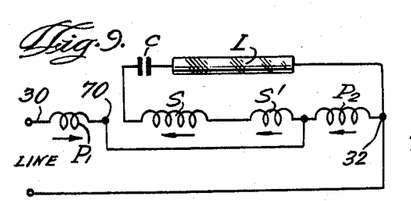

Practical circumstances may dictate the advisability of arranging the connections of a ballast so that the winding $P_1$ may be eliminated from the igniting and operating circuits to obtain the maximum voltage for igniting and operating the gaseous discharge devices without the bucking effect of said primary part $P_1$. FIGS. 7, 8 and 9 show such circuits, which correspond generally to FIGS. 3, 5 and a modified form of FIG. 5.

In FIG. 7, the left hand terminal 30 of the winding $P_1$ and the right hand terminal 32 of the winding $P_2$ are connected across the line. The secondary winding S, the condenser C, and the discharge device L are all in series and connected only across the primary part $P_2$, from the terminal 32 to the right hand terminal 70 of the primary part $P_1$. Thus, the secondary winding S and the primary part $P_2$ are connected in auto-transformer relationship, omitting the primary part $P_1$. The instantaneous open circuit voltage relationships are as indicated by the arrows with S and $P_2$ additive, while $P_1$ is bucking $P_2$. The inductive effect of $P_1$ will be felt in both the igniting and operating circuits, but its voltage will not contribute directly, either to the ignition or operation of the gaseous discharge device, as explained above in connection with the change made in the circuit of FIG. 5.

The circuit of FIG. 9 differs somewhat from the circuit of FIG. 8 in that the gaseous discharge device is connected to the terminal 32 and hence to one side of the line. This is desirable for certain purposes.

Figure 10:
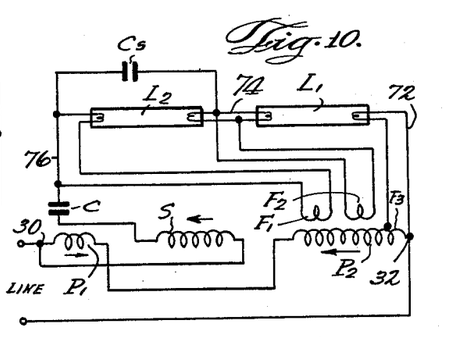
FIG. 10 is a circuit diagram illustrating apparatus for use with rapid-start gaseous discharge lamps, but embodying the invention therein.

FIG. 10 illustrates a circuit in which the invention is embodied in apparatus for the ignition and operation of gaseous discharge devices of the so-called rapid-start type, in which there are filaments which are continuously energized. There is a primary part $P_1$ and a secondary part $P_2$ in series therewith but in voltage opposition, as indicated, the primary parts being connected across the line at their terminals 30 and 32. Gaseous discharge devices $L_1$ and $L_2$ are connected in series with a power factor correcting condenser C and the secondary winding S, the series circuit as described being connected across the terminals 30 and 32. The leads which define this series circuit are 72, 74 and 76. The other electrical leads illustrated in the figure comprise lead means used for energizing the filaments of the gaseous discharge devices. A filament winding $F_1$ energizes the left hand filament of the gaseous discharge device $L_2$, a filament winding $F_2$ energizes the right hand filament of the gaseous discharge device $L_2$ and the left filament of the gaseous discharge device $L_1$, and a filament winding $F_3$ (which may be a few of the end turns of the primary part $L_2$) energizes the right hand filament of the gaseous discharge device $L_1$. All filament windings are closely coupled to the primary part $P_2$ and have current flowing therein at all times. Since the voltage of the primary part $P_2$ is substantially higher than line voltage, less than the usual number of turns of wire are required to obtain the necessary voltage and current from the filament windings.

As in the case of the ordinary rapid-start series sequence start circuit, a starting condenser $C_s$ is in shunt with the discharge device $L_2$. The device $L_1$ starts first, after which flow of current through the condenser $C_s$ provides a voltage across the discharge device $L_2$ starting it. As in the case of FIG. 1, the secondary and both primary parts are in auto-transformer relationship, notwithstanding the fact that the winding $P_1$ is in voltage opposition to the other two. The core with which the circuit of FIG. 8 may be associated is substantially the core of FIGS. 1 or 6, except that the filament windings are closely coupled with the primary part $P_2$. In FIG. 6, they would be in substitution of the winding $S_1$.

Rapid-start series-sequence start ballasts advantageously might provide a shunt between the windings $P_2$ and S which would enable the use of cores of the type shown and described in application Serial No. 560,783, filed January 23, 1956, by Bernard Stevens and Reginald D. Christiansen, entitled "Transformer Core Construction," and assigned to the same assignee as that to which this application is assigned. Likewise the usual forced type of core could be used.

Figure 11:
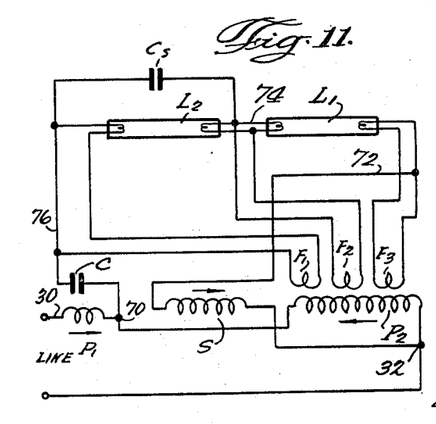
FIG. 11 is a circuit diagram similar to that of FIG. 10 but differing therefrom in that a portion of the primary winding is not included in the igniting and operating circuit.

FIG. 11 differs from FIG. 10 in the respect that the primary part $P_1$ does not contribute voltage directly to the ignition and operation of the gaseous discharge devices. Thus the series circuit described and comprising the two discharge devices $L_1$ and $L_2$ together with the condenser C and the secondary winding S are connected across the terminals 32 and 70. But for the slight change in the filament winding $F_3$, the circuit is like that of FIG. 10 in all other respects.

Figure 12:
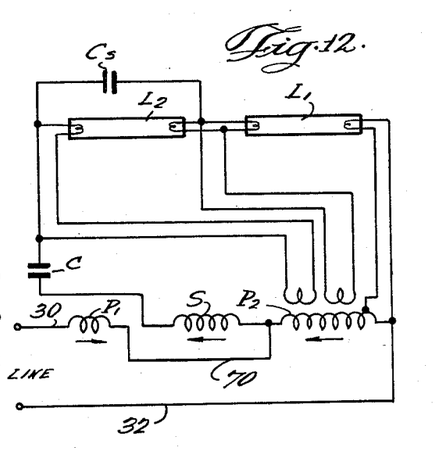
FIG. 12 is a circuit diagram similar to that of FIG. 11 but illustrating a modified form.

FIG. 12 illustrates a variation in the form of the circuit of FIG. 11 in which the secondary winding S is connected to the terminal 70, instead of the terminal 32 as in FIG. 11. Thus, in FIG. 12, the right hand terminal of the discharge device $L_1$ is connected to the terminal 32, and the other changes follow.

Figure 13:
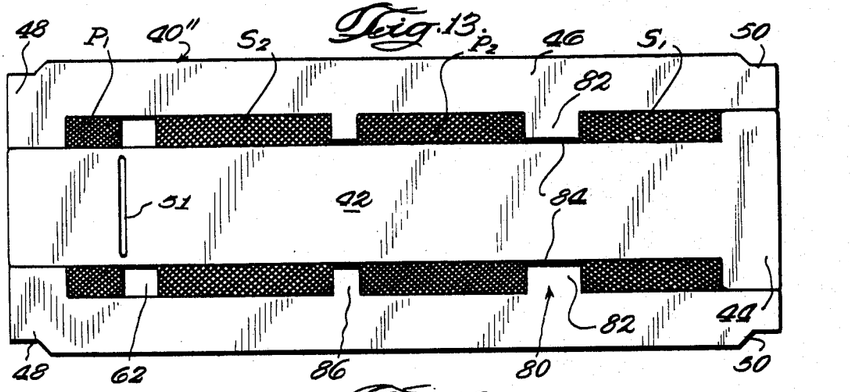
FIG. 13 is a diagrammatic sectional view through a modified form of transformer constructed in accordance with the invention, illustrating the formation of the core and the placement of windings thereon for a sequence-start circuit for gaseous discharge devices, the core being of the clamped variety.
Figure 15:
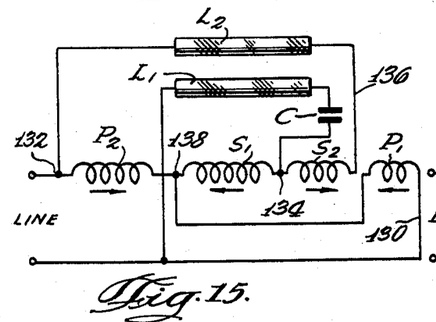
FIG. 15 is a circuit diagram of one form of sequence-start apparatus constructed according to the invention.

The invention is applicable to the series sequence gaseous discharge device circuits which are shown and described in said U.S. Patent 2,558,293. Such circuits embodying the invention are shown in FIGS. 15 through 26 inclusive. These circuits require at least an additional secondary winding, and in certain cases a third secondary winding, and hence the cores are constructed somewhat differently from those of FIGS. 1 and 6. In FIG. 15, for example, there are the primary parts $P_1$ and $P_2$ and the secondary windings $S_1$ and $S_2$ and in FIG. 19 there is a third secondary winding $S_3$. In FIG. 13 there is illustrated one form of core 40″ which is suitable for use with the apparatus to be described hereinafter. In many respects it is similar to the cores 40 and 40′ of FIGS. 1 and 6 respectively in that it is formed of a central T-shaped winding leg 42 having a cross bar end 44 clamped between the ends of the L-shaped side members 46 whose short bar ends 48 clamp together the left hand end of the winding leg 42.

The windings $P_1$, $P_2$, $S_1$ and $S_2$ are disposed as shown, with the same space 62 between $P_1$ and $S_2$. As will be seen, during operation the circuit does not differ substantially from an operation circuit in which there is a series secondary winding, two gaseous discharge devices and a condenser all in series and in auto-transformer relationship with a primary winding. In said circuit, the series secondary winding is the winding $S_2$ and this is disposed therefore, between the two primary parts $P_1$ and $P_2$. The winding $S_1$ is a high leakage reactance secondary winding used in igniting the gaseous discharge devices, and it is thus separated from the remainder of the transformer by a shunt 80 formed of extensions 82 provided on the sides 46 and gaps 84. A similar shunt 86 may be provided between the windings $P_2$ and $S_2$, although, as seen in FIG. 14, this may not be essential.

Since the structure as described is capable of operating without the three slots 51, 52 and 53, only one of these is shown in FIG. 13. The winding $S_2$ being not necessarily as long as the winding S in previous structures, the need for flux distribution along the length thereof decreases. The core 40″ is also of the clamped variety and hence would have some means such as the notches 50 to cooperate with clamping devices (not shown).

Figure 14:
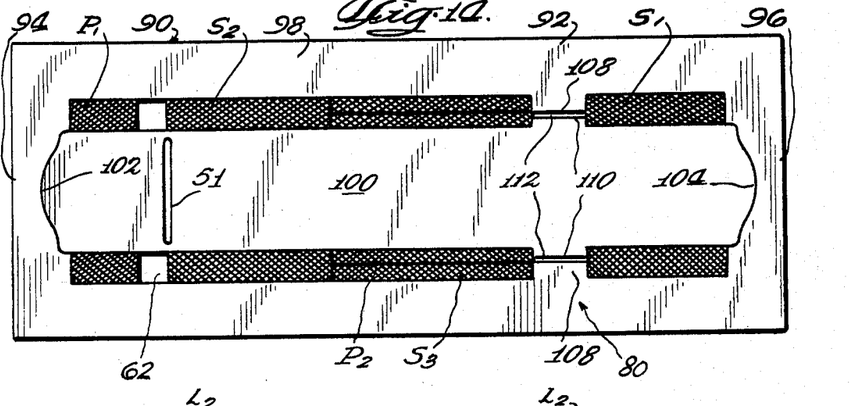
FIG. 14 is a modified form of the core of FIG. 13, especially intended for a somewhat different circuit, the core being of the forced center type.

FIG. 14 is an illustration of a forced core type of structure 90 having an outer shell 92 with end yokes 94 and 96 and sides 98. The central winding leg 100 has ends which mate with the yokes at 102 and 104 so that an assembled winding leg with its associated windings $P_1$, $S_2$, $P_2$, $S_1$, and an additional winding $S_3$ if included, may be pressed into the shell 92 in tight engagement. The space 62 is again provided between the windings $P_1$ and $S_2$ and a shunt is formed at 80 by providing aligned projections 108 and 110 on the shell 92 and winding leg 100 respectively. A suitable gap is provided at 112. One slot 51 is shown. Note that a shunt equivalent to the shunt 86 has been eliminated.

The circuit shown in FIG. 15 is one in which the voltage across the windings $P_1$ and $S_1$ are applied across the first gaseous discharge device $L_1$ through the condenser C. The right hand terminal 130 of the winding $P_1$ and the left hand terminal 132 of the winding $P_2$ are connected across the line, the two primary parts being in voltage opposition. In the U.S. Patent 2,558,293 above referred to, this particular circuit, in which the primary winding and second secondary winding are in additive open circuit voltage relation, while the first secondary winding is in bucking open circuit voltage relation to the other two windings, the first gaseous discharge device to ignite is in series with a condenser and connected across the first secondary winding alone. In a circuit as described, the first gaseous discharge device to ignite is thus connected with one terminal to the line. This is desirable for several purposes. To connect this device to the line using the circuit of the invention, the primary part $P_1$ may be connected into the circuit with the first secondary winding.

Thus, in FIG. 15, the left hand terminal of the gaseous discharge device $L_1$ is connected to the terminal 130 which leads to the line, the right hand terminal being connected in series with the condenser C and to the junction 134 between the two secondaries $S_1$ and $S_2$. The second to ignite gaseous discharge device $L_2$ is connected across the three windings $P_2$, $S_1$ and $S_2$ from the terminal 132 to the terminal 136 of the right hand end of the second secondary winding $S_2$. When the circuit is energized initially, the voltage across the winding $S_1$ alone, notwithstanding the subtractive effect, if any of the winding $P_1$, is sufficient to ignite the discharge device $L_1$. The flow of current through the discharge device and the winding $S_1$ causes the reversal of phase producing a quadrature component then additive to the voltages of $P_2$ and $S_2$ with the result that the second gaseous device will ignite. The high leakage reactance of the winding $S_1$ forces current to flow in series through the gaseous discharge devices, $L_1$ and $L_2$, the secondary winding $S_2$, and the condenser C. This effective series circuit is across the primary winding $P_1$—$P_2$ and hence is now in auto-transformer relationship therewith. During ignition, the first secondary winding $S_1$ could be considered as having been in auto-transformer relationship with the primary part $P_1$ although bucking, while the secondary winding $S_2$ was in additive auto-transformer relationship only with the primary part $P_2$.

Figure 16:
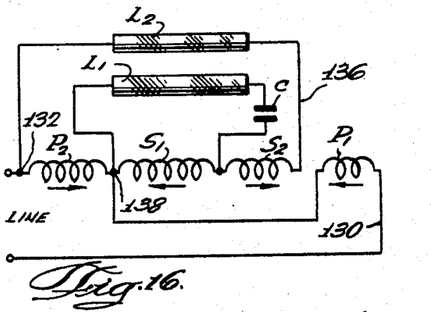
FIG. 16 is a circuit diagram similar to that of FIG. 15, but illustrating a modified form in which only one portion of the primary winding is connected into the igniting and operating circuit.

This same circuit is shown with a modification in FIG. 16. Here the primary part $P_1$, does not contribute directly either to ignition of either of the gaseous discharge devices or to the operation thereof. Instead of being connected to the terminal 130, the left hand end of the gaseous discharge device $L_1$ is connected to the junction 138 between the windings $P_1$ and $P_2$ which is also the point at which the left hand terminal of the first secondary winding $S_1$ is connected. The manner in which the gaseous discharge devices are ignited and operated will be evident from this circuit and a consideration of FIG. 15. The disadvantage of the circuit is that the left hand terminal of the discharge device $L_1$ does not open to the line, but this disadvantage can be overcome in certain cases, as will be seen hereinafter.

The said Patent 2,558,293 also described a variation of the sequence start circuit in which, while the two secondary windings are still in voltage opposition on open circuit, the gaseous discharge devices are connected somewhat differently. The primary winding is in additive open circuit voltage relationship with the first secondary winding and the first to ignite gaseous discharge device is connected in series with a condenser and together therewith across the primary and first secondary windings. The second to ignite gaseous discharge device is connected across both of the secondaries. The first secondary winding is thus in common with both igniting loops. When the transformer is energized, the first lamp ignites by virtue of the total voltage of the primary and first secondary windings together, after which flow of current causes a reversal of phase in the first secondary winding giving rise to a component of voltage therein which is now additive to the voltage of the second secondary. Thus, after ignition of the first gaseous discharge device there is sufficient voltage across the second gaseous discharge device to ignite the same. The flow of current is principally through the gaseous discharge devices, condenser and the second secondary, since the leakage reactance of the first secondary winding is so great as to impede the flow of current therethrough. During operation, the secondary winding is in additive auto-transformer relationship with the primary winding although bucking during starting.

The invention is applied to the variation of Patent 2,558,293 described above in the circuit of FIG. 17. The primary here is composed of two parts $P_1$ and $P_2$ which are in voltage opposition. The first to ignite discharge device $L_1$ is in series with the condenser C and together therewith connected across the windings $P_2$ and $S_1$, from the terminal 132 to the junction 134. In this respect the connection is similar to that of the said Patent 2,558,293.

Figure 17:
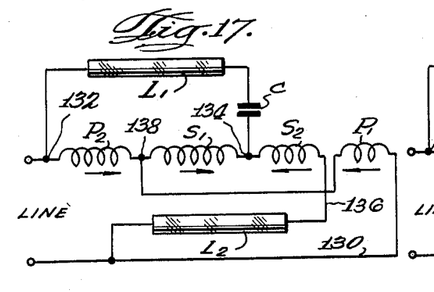
FIG. 17 is a circuit diagram of another form of sequence-start apparatus constructed in accordance with the invention.

The second gaseous discharge device $L_2$, however, is connected from the right hand terminal 136 of the winding $S_2$ to the right hand terminal 130 of the primary part $P_1$, and hence it is subject to the voltage of the three windings $P_1$, $S_1$ and $S_2$ on ignition and also during operation. As in the case of FIG. 15, the circuit includes the winding $P_1$ to enable the gaseous discharge device $L_2$ to be connected to a line terminal.

Figure 18:
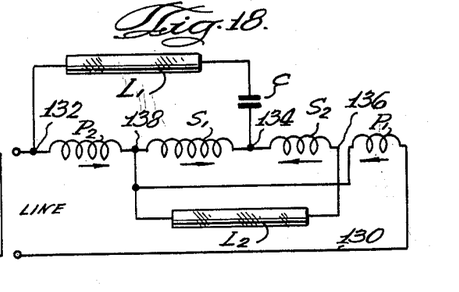
FIG. 18 is a circuit diagram similar to that of FIG. 17 but illustrating a modified form in which only one portion of the primary winding is connected into the igniting and operating circuit.

In FIG. 18 there is illustrated the modified form of the circuit of FIG. 17 in which the primary part $P_1$ is not directly connected to contribute to the voltage of ignition or operation of the circuit. In this case, the left hand terminal of the gaseous discharge device $L_2$ is connected to the junction 138 between windings $P_2$ and $S_1$. The bucking effect of the winding $P_1$ is thus eliminated and higher voltages on ignition and during operation may be realized.

In U.S. Patent No. 2,683,243 there is described an improvement of the apparatus of U.S. Patent No. 2,558,293 in which additional voltage for the ignition and operation of the gaseous discharge devices is achieved by having a portion of the second secondary winding closely coupled with the primary winding. The advantages of this structure are that there is better balance of currents, the additional voltage is achieved through an economical use of copper, and there is no substantial increase in the size of the transformer. Such a ballast is quieter and gives better wave shape. This modification is used in the embodiments of the invention which are shown in FIGS. 19, 20, 21 and 22. The differences between these circuits are the same as those between the circuits of FIGS. 17, 18, 15 and 16 respectively. The only change is the addition of the secondary winding $S_3$ closely coupled with the primary part $P_2$.

Figures 19, 20:
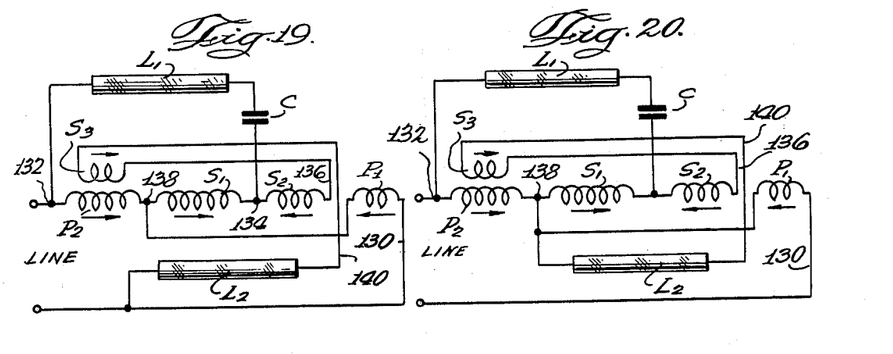
FIG. 19 is a circuit diagram similar to that of FIG. 17, but of a modified form in which there is an additional secondary winding which is closely coupled with a portion of the primary winding.
FIG. 20 is a circuit diagram similar to that of FIG. 19 but of a modified form in which only one portion of the primary winding is connected into the igniting and operating circuit.
Figures 21, 22:
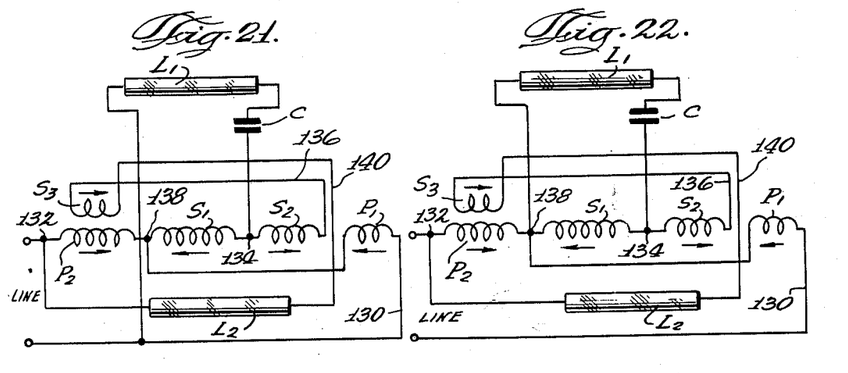
FIG. 21 is a circuit diagram similar to that of FIG. 15, but illustrating a modified form in which there is an additional secondary winding which is closely coupled with part of the primary winding.
FIG. 22 is a circuit diagram similar to that of FIG. 21 but illustrating a modified form in which only a portion of the primary winding is connected into the igniting and operating circuit.

Looking at FIG. 19 for example, the connection of the gaseous discharge device $L_1$, the condenser C, the primary part $P_2$ and the first secondary winding $S_1$ are the same as in FIG. 17. As in the case of the circuit of FIG. 17, the left hand terminal of the gaseous discharge device $L_2$ is connected to the right hand terminal 130 of the primary part $P_1$. The third secondary winding $S_3$ is interposed between the right hand terminal 136 of the second secondary winding $S_2$ and the right hand terminal of the gaseous discharge device $L_2$ at 140. Winding $S_3$ is in additive open circuit voltage relationship with the winding $S_2$.

The operation of the circuits of FIGS. 19, 20, 21 and 22 is similar to the operation of the respective circuits of FIGS. 17, 18, 15 and 16, and hence no further explanation thereof is believed necessary.

Figures 23, 24:
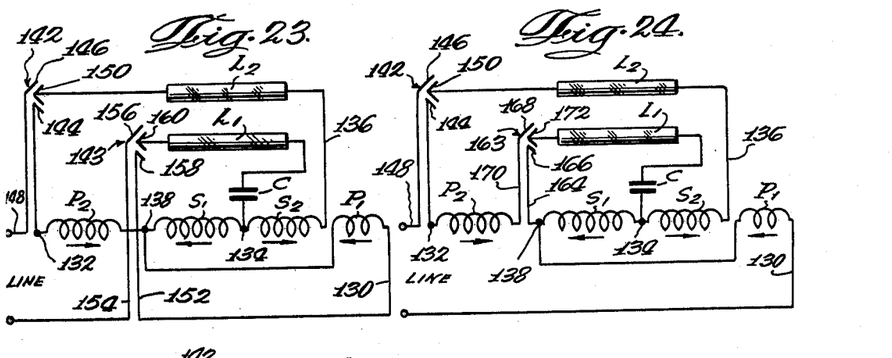
FIG. 23 is a circuit diagram similar to that of FIG. 15, but illustrating a modified form in which shunting sockets are connected into the terminals of the primary winding to open the line with the removal of either gaseous discharge device.
FIG. 24 is a circuit diagram similar to that of FIG. 16 but illustrating a modified form with shunting sockets for enabling opening of the primary winding with the removal of either gaseous discharge device.

As mentioned previously there are advantages to having gaseous discharge devices terminate at the line terminals, one of which consists of the facility of using the so-called shunting sockets. These sockets include two contacts which are open until bridged by the inserted terminal of the gaseous discharge device, so that removal of the device opens the line into which the socket is connected. In this manner, a requirement of the Underwriters Laboratories is met for lamps of relatively high voltage. In FIG. 23 there is illustrated the circuit of FIG. 15 which has been modified by the addition of the shunting sockets 142 and 143.

The electrical connections and operations of the circuit of FIG. 23 are identical to those of the circuit of FIG. 15 except that the leads to the line are opened for the insertion of the sockets. Thus, instead of extending directly to one side of the line, the left hand terminal 132 of the winding $P_2$ connects to one contact 144 of the socket 142, the other contact 146 of which connects by way of the lead 148 to the line. The left hand terminal 150 of the gaseous discharge device $L_2$ bridges the contacts 144 and 146 when inserted in socket 142 and opens the primary winding $P_1$—$P_2$ when removed. The lead from the terminal 130 to the line is opened providing leads 152 and 154 which extend to the contacts 156 and 158 of the socket 143, the left hand terminal 160 of the discharge device L₁ bridging these contacts when in position in socket 143.

FIG. 24 is a modified form of FIG. 16 using shunting sockets. Since the usual commercial ballast is in the form of a canister with electrical wires extending therefrom, it is preferable to have as few leads as possible so as not to confuse the user. In FIG. 23, the connection between the primary winding parts P₁ and P₂ is on the interior of the canister, and the leads 132 and 152 are brought out of the canister. The leads 148 and 154 are readily connected to the respective sockets. The advantage of eliminating the bucking effect of the primary part P₁ is somewhat offset by the circuit of FIG. 24 in that the connection between the primary parts P₁ and P₂ is open and hence there is at least an additional lead which must be brought out of the canister and connected to exterior components.

In FIG. 24, the junction 138 does not connect directly to the right hand terminal of the primary part P₂ but instead extends by lead 164 to the contact 166 of the shunting socket 163. The other contact 168 extends by lead 170 to the right hand terminal of the primary part P₂. The left hand terminal 172 of the gaseous discharge device L₁ is adapted to bridge the contacts of the shunting socket 163. The operation of the circuit is identical to that of FIG. 16, and the connection of the gaseous discharge device L₂ is exactly like that of FIG. 23. Note that it will be necessary to extend the leads 130, 164, 170 and 132 from the canister in addition to the two leads for the right hand terminals of the gaseous discharge devices. This is an increase of two leads over those of FIG. 23.

Figure 25:
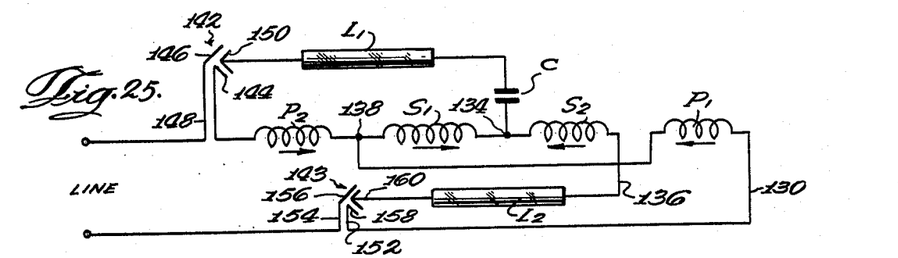
FIG. 25 is a circuit diagram similar to that of FIG. 17 but illustrating a modified form with shunting sockets for enabling opening of the line with the removal of either gaseous discharge device.
Figure 26:
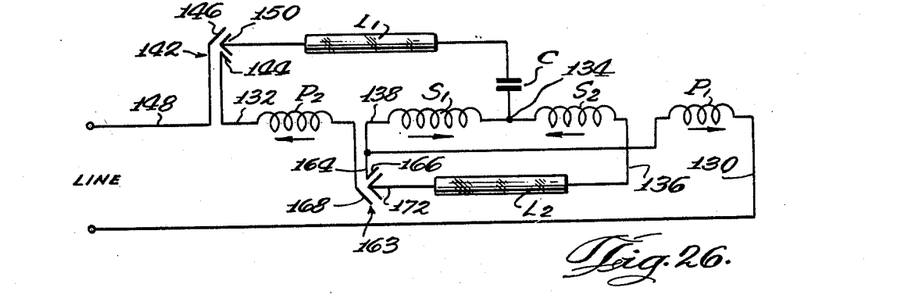
FIG. 26 is a circuit diagram similar to that of FIG. 18 but illustrating a modified form with shunting sockets for enabling opening of the primary winding with the removal of either gaseous discharge device.

FIGS. 25 and 26 are circuits which are electrically similar to those of FIGS. 17 and 18 respectively, but differ physically in the use of the shunting sockets. These circuits have the shunting sockets 142 and 143 in FIG. 25 both at line terminals, but in FIG. 26 only the shunting socket 142 is at a line terminal. The shunting socket 163 is located between the primary parts P₁ and P₂ in FIG. 26. It is believed that the circuits need not be explained in detail, since their manner of operation is similar in all respects to circuits already described.

The circuits which are illustrated in FIGS. 2, 3, 4, 5, 7, 8, 9, 10, 11 and 12 have the windings positioned therein the same relative locations that the windings are actually positioned on the cores used therewith and illustrated in FIGS. 1 and 6. The circuits which are illustrated in FIGS. 15 through 26 inclusive, are not drawn in this manner in order to avoid any confusion. The windings are in every case arranged on the core with the primary part P₂ disposed between the two secondary windings S₁ and S₂, and the primary part P₁ is in every case located outside of the second secondary winding S₂ being separated by means providing a very loose coupling which preferably is space 62.

In all of the illustrations the conventional symbols for iron cores has been intentionally omitted, also in the interests of clarity. All of the structures are mounted on iron cores formed of stacks of laminations clamped or riveted together in conventional manners, and where described, as in apparatus whose windings are to be mounted on the cores 40" and 90 of FIGS. 13 and 14, suitable shunts are used. In FIGS. 13 and 14 these shunts are shown formed of integral portions of the side members or winding legs, but small separate shunts may be formed of laminated assemblages of the usual silicon steel sheet and inserted in place. Likewise, powdered metal shunts may be used.

All of the ballasts which include the windings and the condensers are potted in steel canisters using any suitable heat-dissipating potting compound such as pitch and silica mixtures. These canisters affect the voltages and characteristics of the apparatus slightly because of their inductive effect upon the magnetic structure, and in utilizing the teachings of this invention these factors, well-known to those skilled in the art, are taken into consideration. In connecting the circuits of the invention, as in all gaseous discharge circuits, small condensers are used to eliminate radio interference, and large ohmage resistors are connected across the large capacitors to prevent accumulation of charge. Neither the radio interference condensers nor the leakage resistors are shown in the illustrations.

It is believed that there is no need to set forth examples of the rapid-start circuits or the sequence-start circuits in addition to those already discussed in the parent case. The details of the former are well known, and the details of most of the modifications of U. S. Patents 2,558,293 and 2,683,243 are so universally used throughout the world that ballast engineers are almost without exception fully aware of the same. The specifications of the said patents contain specific examples, from the data of which, the invention herein is readily applied thereto to achieve the circuits described in FIGS. 16 through 26 inclusive.

What it is desired to claim by Letters Patent of the United States is:

1. Apparatus for igniting and thereafter providing operating voltage for at least one gaseous discharge device from a source of A.C. voltage which comprises, an elongate iron core having a primary winding mounted thereon adapted to be connected across said source and being formed of first and second primary parts, said primary parts being series connected in voltage opposition to one another and physically separated along the length of said core, at least one secondary winding disposed on said core, said secondary winding being more closely coupled with said second primary part than with said first primary part, a condenser, lead means connecting said condenser in series with said one secondary winding, second lead means being connected exteriorly of said last named series connected condenser and winding and adapted for connecting said one gaseous discharge device in series therewith; and means connecting said one secondary winding in auto-transformer relationship with at least said second part of said primary winding, and said second primary part and said one secondary winding being in bucking voltage relationship on open circuit, but being additively operative after ignition of a gaseous discharge device energized thereby.

2. Apparatus for igniting and thereafter providing operating voltage for a pair of gaseous discharge devices adapted to be ignited seriatim and thereafter operated as substantially a series-connected circuit, and including a low voltage A.C. source, a pair of gaseous discharge devices, a primary winding connected across the said source and being formed of two series connected parts arranged in open circuit bucking voltage relationship, an elongate iron core and the parts being spaced from one another along the core, a secondary winding disposed upon the core in relatively close coupled relationship with the second primary part and the core having means providing a relatively loose coupling between the first primary part and the said secondary winding, one of said gaseous discharge devices being connected in open circuit auto-transformer relationship with said secondary winding and at least the second of said primary parts with the said secondary winding in additive voltage relationship therein, whereby the combined voltage of said secondary winding and at least said second primary part will provide voltage to operate the said gaseous discharge devices, said apparatus having means providing for the ignition of the other of said gaseous discharge devices in a sequence with said one gaseous discharge device and without utilizing the open circuit voltage of said secondary winding wherein said one gaseous discharge device is the first to ignite and the means providing ignition for the said other gaseous discharge device comprises a reactive impedance shunting the same and adapted to produce a voltage across said other gaseous discharge device after ignition of said one gaseous discharge device causes current to flow through said reactive impedance.

3. Apparatus for igniting and thereafter providing operating voltage for a pair of gaseous discharge devices adapted to be ignited seriatim and thereafter operated as substantially a series-connected circuit, and including a low voltage A.C. source, a pair of gaseous discharge devices, a primary winding connected across the said source and being formed of two series connected parts arranged in open circuit bucking voltage relationship, an elongate iron core and the parts being spaced from one another along the core, a secondary winding disposed upon the core in relatively close coupled relationship with the second primary part and the core having means providing a relatively loose coupling between the first primary part and the said secondary winding, one of said gaseous discharge devices being connected in open circuit auto-transformer relationship with said secondary winding and at least the second of said primary parts with the said secondary winding in additive voltage relationship therein, whereby the combined voltage of said secondary winding and at least said second primary part will provide voltage to operate the said gaseous discharge devices, said apparatus having means providing for the ignition of the other of said gaseous discharge devices in a sequence with said one gaseous discharge device and without utilizing the open circuit voltage of said secondary winding wherein said first primary part is excluded from the auto-transformer circuit.

4. Apparatus as claimed in claim 2 in which the said first primary part is excluded from the auto-transformer circuit.

5. Apparatus for igniting and thereafter providing operating voltage for a pair of gaseous discharge devices adapted to be ignited seriatim and thereafter operated as substantially a series-connected circuit, and including a low voltage A.C. source, a pair of gaseous discharge devices, a primary winding connected across the said source and being formed of two series connected parts arranged in open circuit bucking voltage relationship, an elongate iron core and the parts being spaced from one another along the core, a secondary winding disposed upon the core in relatively close coupled relationship with the second primary part and the core having means providing a relatively loose coupling between the first primary part and the said secondary winding, one of said gaseous discharge devices being connected in open circuit auto-transformer relationship with said secondary winding and at least the second of said primary parts with the said secondary winding in additive voltage relationship therein, whereby the combined voltage of said secondary winding and at least said second primary part will provide voltage to operate the said gaseous discharge devices, said apparatus having means providing for the ignition of the other of said gaseous discharge devices in a sequence with said one gaseous discharge device and without utilizing the open circuit voltage of said secondary winding wherein said one gaseous discharge device is the second to ignite and the said other gaseous discharge device is the first to ignite.

6. Apparatus for igniting and thereafter providing operating voltage for a pair of gaseous discharge devices adapted to be ignited seriatim and thereafter operated as substantially a series-connected circuit, and including a low voltage A.C. source, a pair of gaseous discharge devices, a primary winding connected across the said source and being formed of two series connected parts arranged in open circuit bucking voltage relationship, an elongate iron core and the parts being spaced from one another along the core, a secondary winding disposed upon the core in relatively close coupled relationship with the second primary part and the core having means providing a relatively loose coupling between the first primary part and the said secondary winding, one of said gaseous discharge devices being connected in open circuit auto-transformer relationship with said secondary winding and at least the second of said primary parts with the said secondary winding in additive voltage relationship therein, whereby the combined voltage of said secondary winding and at least said second primary part will provide voltage to operate the said gaseous discharge devices, said apparatus having means providing for the ignition of the other of said gaseous discharge devices in a sequence with said one gaseous discharge device and without utilizing the open circuit voltage of said secondary winding wherein said one gaseous discharge device is the second to ignite and the said other gaseous discharge device is the first to ignite, and in which the means for igniting the said other gaseous discharge device comprises a high leakage reactance starting secondary winding connected to have its voltage applied to the said other gaseous discharge device upon energization of the primary winding, and providing a reverse phase voltage additive to that of the secondary winding after ignition of said other gaseous discharge device whereby to assist in the ignition of said one gaseous discharge device, and being substantially by-passed by flow of current in the resulting series-circuit after ignition of the said first gaseous discharge device.

7. Apparatus as claimed in claim 6 in which the first primary part is connected in series with said starting secondary winding and together therewith across said other gaseous discharge device.

8. Apparatus as claimed in claim 6 in which the starting secondary winding alone is connected across said other gaseous discharge device, and a condenser is connected in series with said other gaseous discharge device.

9. Apparatus as claimed in claim 5 in which the secondary winding is formed of two parts and one secondary part is coupled to said second primary part much closer than said second secondary part is coupled to said second primary part, 10. Apparatus for igniting and operating a pair of gaseous discharge devices from a source of A.C. voltage which comprises, an elongate iron core transformer having the following windings physically mounted thereon in the order named, commencing from one end thereof, a first primary part, a second secondary winding, a second primary part, and a first secondary winding, the coupling between the first primary part and the second secondary winding and between the first secondary winding and the second primary part being substantially less than the coupling between the second primary part and second secondary winding, the primary parts being connected in series bucking relation and across the source and providing thereby three terminals, the first of which is at the source end of the second primary part, the second of which is at the junction of the primary parts, and the third of which is at the source end of the first primary part; first and second gaseous discharge devices, and a condenser, the first secondary winding being connected between the second primary terminal and one side of the second secondary winding and being in open circuit voltage bucking relation with said second secondary, the first gaseous discharge device being connected in series with said condenser and together therewith from said one side of said second secondary winding to one of said primary terminals, and the second gaseous discharge device being connected from the second side of said second secondary winding to a different one of said primary terminals which will place said second gaseous discharge device across at least said first and second secondaries, the terminal connections of said gaseous discharge devices being such as to include said second primary part in an igniting circuit shunting one of said gaseous discharge devices.

11. Apparatus as claimed in claim 10 in which the second secondary winding is formed of two series connected parts, one of which is of substantially less turns than the other and is physically separated from the other and positioned on said transformer closer adjacent said second primary part than is said other second secondary part.

12. Apparatus as claimed in claim 10 in which the first gaseous discharge device and condenser are connected from the first side of said second secondary winding to the second primary terminal whereby to exclude the first primary part from the ignition and operation of either of said gaseous discharge devices.

13. Apparatus as claimed in claim 10 in which the first gaseous discharge device and condenser are connected from the first side of the second secondary winding to the first primary terminal and the second gaseous discharge device is connected from the second side of the second secondary winding to the second primary terminal whereby to exclude the first primary part from the ignition and operation of either of said gaseous discharge devices.

14. Apparatus as claimed in claim 10 in which the first gaseous discharge device is connected to the third primary terminal and the second gaseous discharge device is connected to the first primary terminal.

15. Apparatus as claimed in claim 10 in which the first gaseous discharge device is connected to the first primary terminal and the second gaseous discharge device is connected to the third primary terminal.

16. Apparatus as claimed in claim 10 in which the primary winding has two shunting sockets connected in series therewith at the respective terminals of connection of said gaseous discharge devices and the continuity of the primary winding is completed only when said gaseous discharge devices are properly installed in said sockets, whereby removal of either of said gaseous discharge devices will electrically disable said apparatus.

17. Ballast apparatus for starting and operating arc discharge devices comprising, a high reactance transformer having a primary winding and at least one secondary winding, said transformer including an elongate iron core, and the primary winding being formed of two physically separated but electrically connected parts, said primary parts being spaced apart on said core with the secondary winding located therebetween and with one part more loosely coupled with said secondary winding than said second part, the primary parts being wound in voltage opposition one to the other, a pair of lead means for connecting all of said primary winding to an alternating current source, and means including leads forming a series connection including said secondary winding, and a condenser, said last named means including said secondary winding and said condenser being connected and adapted to include a pair of arc discharge devices therein and extending across two terminals exterior to at least one of said primary parts whereby to connect at least said one primary part in auto-transformer relation with said secondary winding.

18. A ballast apparatus as claimed in claim 17 in which the series connection extends across the entire primary winding.

19. A ballast apparatus as claimed in claim 17 in which there is a second secondary winding mounted on said core having a loose coupling relative to the other windings whereby to provide a high leakage reactance, and said second secondary winding is connected from a terminal of said first-mentioned secondary winding to said primary winding to provide a starting voltage for one of said arc discharge devices, and being in voltage opposition to said first-mentioned secondary winding.

20. Apparatus for igniting and thereafter providing operating voltage for a pair of gaseous discharge devices connected in series from a source of A.C. voltage and there being means provided for starting first one of said discharge devices and thereafter the other of said gaseous discharge devices, which comprises, an elongate iron core having a primary winding mounted thereon adapted to be connected across said source and being formed of first and second primary parts, said primary parts being series connected in voltage opposition to one another and physically separated along the length of the core, at least one secondary winding disposed on said core closer coupled with said second primary part than said first primary part, a condenser, lead means for connection across opposite electrodes of said gaseous discharge devices, said lead means being connected in series with said condenser and with said secondary winding, and means connecting said one secondary winding in auto-transformer relationship with at least said second part of said primary winding being in voltage additive relationship.

21. Apparatus as claimed in claim 20 in which the entire primary winding is connected in auto-transformer relationship with said one secondary winding.

22. Apparatus as claimed in claim 20 in which said one secondary winding has a connection extending from one terminal thereof to said primary winding between the parts of said primary winding.

23. Apparatus as claimed in claim 22 in which said connection includes a second secondary winding mounted on said core loosely coupled with said primary winding.

24. Apparatus as claimed in claim 20 in which said one secondary winding is connected to an end terminal of said primary winding.

25. Apparatus as claimed in claim 20 in which there is a second secondary winding mounted on said core, loosely coupled relative said other windings and in voltage opposition to said one secondary, said second secondary being connected between a terminal of said primary winding and said condenser and said lead means including connections providing a by-pass for one of said gaseous discharge devices during starting through at least said condenser and second secondary winding, whereby upon ignition of said one gaseous discharge device the voltage in said second secondary winding will have a component in aiding relationship with the voltage of said one secondary to assist in starting the second gaseous discharge device, but after starting, said by-pass will have a high impedance to flow of operating current.

26. Apparatus as claimed in claim 25 in which there is a discontinuity in series with said primary winding adapted to be closed by one of said gaseous discharge devices.

References Cited in the file of this patent

UNITED STATES PATENTS

| 2,496,981 | Boucher | Feb. 7, 1950 |
| 2,568,553 | Mauerer | Sept. 18, 1951 |
| 2,648,802 | Kazebee | Aug. 11, 1953 |